(12) United States Patent
Ruocco et al.

(10) Patent No.: US 8,237,313 B2
(45) Date of Patent: Aug. 7, 2012

(54) METHOD AND APPARATUS FOR WIRELESS TRANSMISSION AND RECEPTION OF ELECTRIC POWER

(76) Inventors: John Ruocco, Mastic, NY (US); Ronald Koppel, Shirley, NY (US)

( * ) Notice: Subject to any disclaimer, the term of this patent is extended or adjusted under 35 U.S.C. 154(b) by 487 days.

(21) Appl. No.: 12/420,306

(22) Filed: Apr. 8, 2009

(65) Prior Publication Data

US 2010/0259111 A1    Oct. 14, 2010

(51) Int. Cl.
*G05F 3/06* (2006.01)
*H01F 38/00* (2006.01)

(52) U.S. Cl. .......................... 307/151; 307/104
(58) Field of Classification Search .......... 307/104, 307/151
See application file for complete search history.

(56) References Cited

U.S. PATENT DOCUMENTS

| | | | |
|---|---|---|---|
| 4,689,803 A | 8/1987 | Johannessen et al. | |
| 5,990,670 A | 11/1999 | Derks | |
| 7,170,821 B1 * | 1/2007 | Tonn et al. | 367/141 |
| 7,656,692 B2 * | 2/2010 | Sadwick et al. | 363/89 |
| 7,880,338 B2 * | 2/2011 | Jin | 307/104 |
| 7,919,886 B2 * | 4/2011 | Tanaka | 307/104 |
| 2006/0063488 A1 | 3/2006 | Hraby et al. | |
| 2008/0157780 A1 | 7/2008 | Beeman | |
| 2009/0102292 A1 * | 4/2009 | Cook et al. | 307/104 |
| 2010/0090539 A1 | 4/2010 | Auchterlonie | |

* cited by examiner

*Primary Examiner* — Hal Kaplan
(74) *Attorney, Agent, or Firm* — Ladas & Parry LLP

(57) ABSTRACT

An electric transmission system utilizes charge displacement for the wireless delivery of electric power. A transmitter for radiating a charge displacement current at a frequency of approximately 2 to 7 kHz to a receiver located remote from the transmitter. The receiver receives the charge displacement current and converts the current into a form of electric power usable by an electrical device coupled to the receiver. The transmitter may use a step up transformer with an input approximating a series of step function pulses at the intended transmission frequency to produce the required high voltage for transmission. The primary winding of the transformer is part of a tuned circuit having a resonant frequency higher than the frequency of the charge displacement current radiated.

12 Claims, 2 Drawing Sheets

METHOD AND APPARATUS FOR WIRELESS TRANSMISSION AND RECEPTION OF ELECTRIC POWER

The present invention relates to the field of electric energy transmission and distribution and specifically to a method and apparatus to deliver electric power to users wirelessly,

BACKGROUND OF THE INVENTION

Conventional electric power transmission and distribution to consumers involves a sophisticated system of transmission and distribution wires interconnected by transformers to raise or lower the voltage to appropriate levels during the delivery process. In addition, due to differing loads, capacitors and/or inductors may be switched into or out of the delivery circuits.

The costs to install and maintain the circuits are substantial. When new customers appear, new wiring must be installed to connect them to the transmission and distribution grid. In addition, there can be significant energy losses associated with the delivery, and spurious electromagnetic radiation can be developed which further degrades system performance and can create interference.

It is accordingly a purpose of the present invention to provide an electric power delivery system that avoids deficiencies of wired systems by utilizing a wireless transmission mechanism. Among the characteristics of such a system are a reduction or substantial elimination of electromagnetic radiation, and the ability to connect additional uses to the system at reasonable cost.

BRIEF DESCRIPTION OF THE INVENTION

In accordance with the foregoing and other objects and benefits, an electric power delivery system in accordance with the present invention utilizes the mechanism of charge displacement to transmit electric power from a generation site to a user. The system utilizes extremely low frequencies (ELF) to convey a current and utilizes the earth as a conductor. At the production end of the system conventionally generated electric current is converted into a charge displacement current and transmitted or broadcast wirelessly. A relatively simple receiving apparatus converts the charge displacement current back into a conventional alternating current flow at the location of a user, which current can then be utilized in the standard manner. With appropriate reception equipment, the charge displacement current can be received by moving vehicles, allowing direct receipt of a continuing flow of electrical power during operation.

BRIEF DESCRIPTION OF THE DRAWINGS

A fuller understanding of the invention will be achieved upon consideration of the following detailed illustrative description of a preferred embodiment of the invention when reviewed in conjunction with the annexed drawings, wherein.

DETAILED DESCRIPTION OF THE INVENTION

The present invention incorporates the recognition that, based upon the electromagnetic characteristics of the earth and its surrounding ionosphere, an electrical energy transmission at a frequency in the range of about 2 to 7 kHz maximizes displacement charge transfer from a transmitting apparatus to the atmosphere and earth. The invention incorporates a transmitting element in the form of a capacitor plate that is part of a high voltage resonant circuit tuned to a frequency in the desired range to maximize transmitter efficiency to the atmosphere. The transmitting element is part of a transmitter system that converts electrical power, preferably at DC but typically at a low frequency, such as at mains frequency (60 Hz), and at a relatively low voltage, to the desired high voltage and frequency. The DC or mains frequency input power is pulsed at the desired transmission frequency and is applied to a tuned circuit resonant at a second frequency including a primary transformer winding as the tuned circuit's inductor. The transformer raises the voltage to the desired high voltage for transmission. To allow commercially-reasonably sized components to be used, the transformer is adapted to operate at a substantially higher frequency than the transmission frequency, typically at 50-100 kHz. The high voltage is passed to the transmission frequency-tuned resonant circuit including the transmitting element, allowing the 2 to 7 kHz pulses to be coupled to the earth and ionosphere to conduct the desired charge displacement.

Figure 1:
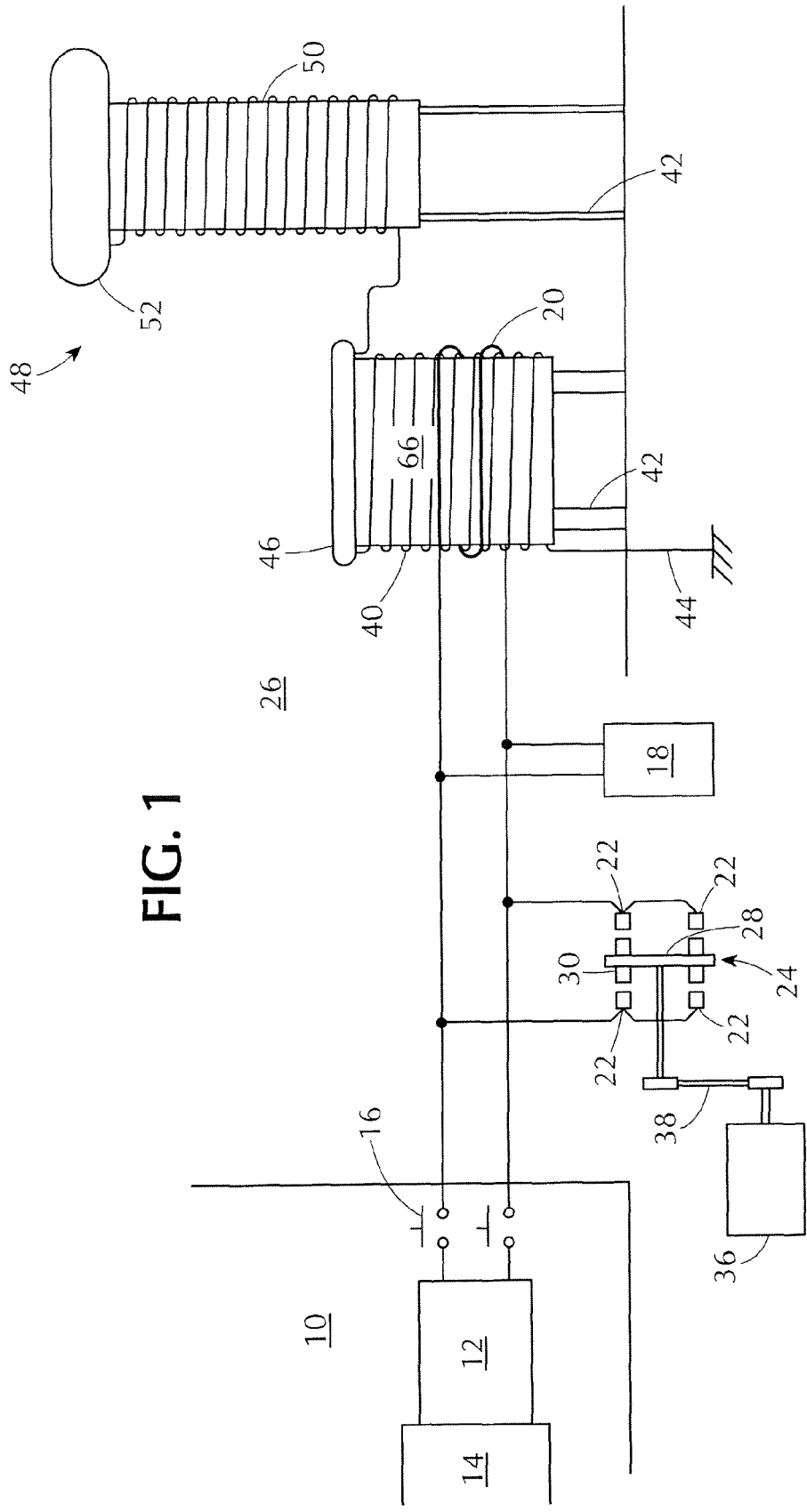
FIG. 1. is an illustration of a transmitter apparatus for generating an ELF charge displacement current in accordance with the invention.

With reference to FIG. 1, generator room 10 houses a generator 12. The generator is shown driven by a motor 14, but other sources of motive power, such as a turbine, may be employed. A commercially available AC generator with a 60 Hz output can be utilized, but the lower the output frequency from the generator the lower losses due to mismatching and harmonic generation. While DC output is optimal, 60 Hz is sufficiently low to be acceptable.

The electrical output from the generator is fed to contactor 16, allowing immediate shutdown of the transmitter to which the output is led in the event of a flashover or other problem in the transmitter room 26. One line of the generator's output goes to one side of the parallel combination of capacitor 18, coil 20 and one electrode assembly 22 of a rotary gap apparatus 24, all located in the transmitter room. The other output line from the generator goes to the other side of capacitor 18 and coil 20 and to a second electrode assembly 22 of the rotary gap apparatus.

Capacitor 18 forms a first resonant or tuned circuit with coil 20, the primary winding for transformer 66, and the resonant frequency of which is given by $F = \frac{1}{2}\Pi\sqrt{L1C1}$. An acceptable value for the capacitor may be in the range of 0.27 uf and for the coil 20 an inductance in the range of 3 mH, which can be accommodated in a 6 foot high coil of 10 foot diameter. Capacitor 18 is chosen to have an appropriate working voltage and a low ESR (Equivalent Series Resistance), while coil 20 is of a conductor gauge appropriate for the current involved. The approximate resonant frequency for the listed component values is 75 kHz. The frequency is chosen to allow transformer 40, of which coil 20 serves as a primary winding, to be of commercially-reasonable dimensions taking into account the current capacity of the turns, the voltage boost contemplated and the need to avoid flashover. As the voltage boost is great, it is generally desired that the number of turns for coil 20 be as low as possible to maintain a large turns ratio with minimal conductor mass.

Figure 2:
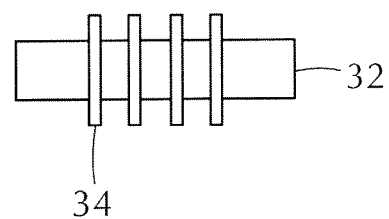
FIG. 2 is a detail view of an interrupter electrode.

The generator's output voltage is modulated by means of the rotary gap apparatus 24, which is in parallel with capacitor 18 and coil 20, and who's purpose is to generate a pulse train in the desired ELF range of 2-7 kHz. Rotary gap apparatus 24 comprises a nonconductive disc 28 supporting four or more electrodes 30 extending through the disc, evenly spaced along its perimeter. Two identical electrode assemblies 22, spaced 180 degrees apart and positioned to align with the disc electrodes, are located at opposite sides of the disc, and are respectively connected to the generator output lines. As depicted in FIG. 2, each electrode assembly 22 may consist of a conductive electrode 32 and a plurality of heat sink rings 34 along the electrode. The electrodes 32 are spaced about ¼ inch from the disc electrodes 30; all the electrodes may be ½ inch in diameter. A motor 36 and transmission 38 rotates the disc 28 and attached electrodes. As the disc rotates its carried electrodes 30 pass by the electrode assemblies 22, allowing current to bridge the inter-electrode gap at a frequency of two times the number of electrode 22 pairs. With a disc rotation speed of 7200 rpm and 2 electrode pairs, the modulation frequency is 3600 Hz. The rotary gap apparatus allows a pulse train approximating a series of step impulses to appear across the resonant circuit combination of capacitor 18 and coil 20. Other means for developing the pulse train, such as an electronic switching circuit, can also be utilized, but must be capable of handling the large current appropriate for significant power transmission.

Coil 20 is wound about the base of a second coil 40 on an insulating form of sufficient diameter and height to allow the coil turns to form the appropriate inductance. The combination of the two coils forms transformer assembly 66 that is supported by insulators 42. The turns ratio between primary coil 20 and secondary coil 40 is such that the output voltage of the generator is raised to several megavolts in coil 40. One end of coil 40 is connected to ground, such as by series of grounding rods 44, while the other (upper) end of the coil is connected to large conductive ring 46 forming a capacitor plate. Ring 46 is constructed and dimensioned to have the appropriate capacitance in free air to form a second resonant or tuned circuit with coil 40 at the same frequency as the resonant frequency of primary coil 20 and capacitor 18. The inductance of coil 40 may be, for example, 14 mH, which can be accommodated in a coil with a diameter of 5 feet and a height of 10 feet. With the coil size and inductance determined, the dimensions for capacitor ring 46 to achieve the appropriate free air capacitance can be determined by those skilled in the art.

Transmitter assembly 48 consists of the series arrangement of a further coil 50, likewise supported by insulators 42, and second conductive ring 52 positioned at the top of the coil and the insulating form upon which it is constructed. The upper end of coil 40 is connected to the lower end of transmitter coil 50, while conductive ring 52 is connected to the upper end of coil 50. Ring 52 is constructed with dimensions, including its radius of curvature and its outside diameter, to yield a capacitance for the ring that, when combined with the inductance of coil 50, create a resonant circuit whose frequency is equal to that of the pulse train generated by the rotary gap apparatus 24, providing efficient coupling of the pulse train energy to the earth and ionosphere, and should preferably be of large capacitance relative to the capacitance of other system components. The radius of curvature of ring 52 should also be large enough so that the ring's surface electrical charge density, which is proportional to the voltage, capacitance and frequency, is small enough at the chosen high working voltage to prevent spark discharge into the surrounding atmosphere. It is contemplated that a ring of up to 200 feet in diameter may be appropriate. With the desired capacitance of the ring calculated, the inductance for coil 50 can be computed, and the physical characteristics of the coil, including number of turns and wire gauge, determined. As the combination of coil 50 and ring 52 is supported by insulators 42 they must be of sufficient size and height to prevent breakdown, even in damp weather.

Conductive ring 52 serves as the resonating element for coil 40. Alternatively, the ring may also be constructed with a group of spaced discs around the entire outer circumference of the ring. Such a construction may prevent the buildup of eddy currents that otherwise may occur in the ring. Alternatively a series of small semicircular discs could be attached to the outside surface of the ring to provide the same effect.

It should be noted that the radiating element is not a dipole antenna, which would require a radiating element of dimensions specific to the wavelength of the transmitted frequency. Rather, the mechanism of transmission is charge displacement, not electromagnetic radiation. Thus, it is not necessary for the lines of flux to detach and close upon themselves to propagate an electric field. Instead, the lines of flux exist between two opposite charges, and the field is established by the lines of flux between the two points of charge. The force on each charge in dynes is given by:

$$F = \frac{q1q2}{4\rho e_o r^2} 10^5.$$

A relatively simple antenna and receiver system may be used to convert the radiated charge into useful energy. The antenna is designed as a terminating point for the field's flux lines. Therefore the antenna does not have to be a specific shape or length. A conversion unit is used in conjunction with the antenna to convert the field to normal 60 Hz electrical power, at which most electrical devices operate.

Figure 3:
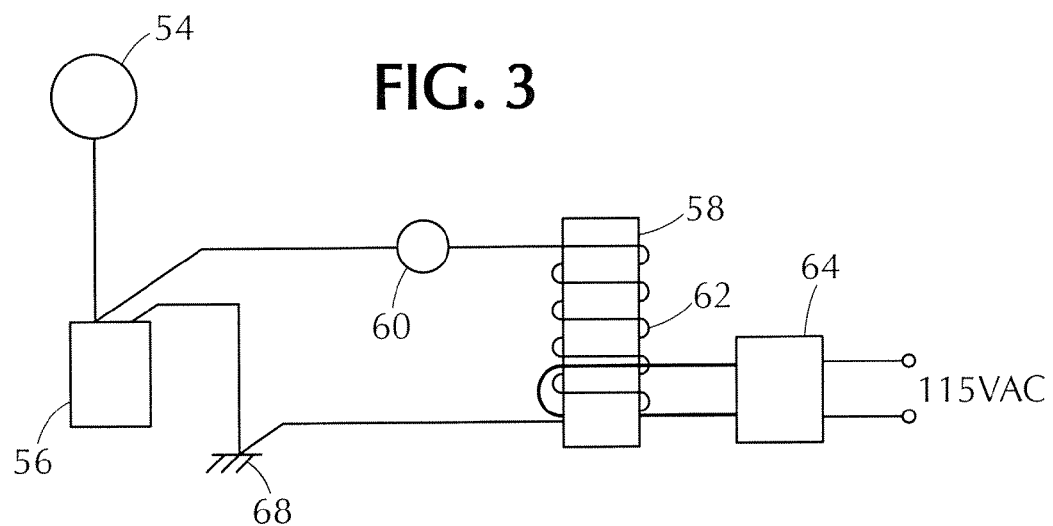
FIG. 3 is an illustration of a receiver apparatus for receiving an ELF charge displacement current.

An illustrative antenna and receiver system is depicted in FIG. 3. An antenna 54 is connected to one side of a large capacitance 56. The other side of the capacitor is connected to a suitable ground or conductive surface acting as a ground plane 68. The size of the antenna and ground plane, if not earth, have a bearing on the amount of power that can be extracted from the atmosphere, and thus should be sufficiently large for the intended draw. The receiving antenna is designed as a terminating point for the field's flux lines, thus the antenna does not have to be a specific shape or length. One side of coil 58 is connected to capacitor 56 through an electrical interrupter 60, which preferably is electronic, rather than mechanical, and as known in the art can be either vacuum tube or solid state. The interrupter is tuned to the same pulse frequency as created by the transmitter's rotary gap apparatus 24, and the combination of capacitor 56 and coil 58 form a resonant circuit likewise tuned to the pulse frequency. Coil 58 and second coil 62, wound around coil 58 and consisting of fewer turns of a conductor, form a stepdown transformer, coil 58 having a wire size capable of carrying the induced current. Secondary coil 62 is connected to a conversion unit 64 as known in the art to convert the pulsating output current from the transformer to normal 60 Hz electrical power or to another frequency and voltage as appropriate for the electrical devices to be powered.

In addition to the obvious uses, such as supplying electricity to residential and commercial buildings, the transmission system of the present invention could also be used to power vehicles. The vehicle may be constructed of a non-conductive material such as fiberglass, and may have the collecting antenna located in the roof. A conversion unit would then convert the electrical energy as received to the form of electricity required by the vehicle's drive, typically an electric motor. The received energy could also be used to charge a battery array to provide power in the event the vehicle leaves a reception area.

The transmission system could also be used to power trains. Since a train system defines a given path, one or more transmitting stations could be set up to focus the broadcast power along the rail path. Those skilled in the art can appreciate that the present invention could likewise be used to deliver electric power to other specific locations and users, thus providing individualized delivery for power tools, outdoor appliances and any other electrical devices that use electricity.

We claim:

1. An electric transmission system, comprising a transmitter for radiating a charge displacement current at a frequency of from 2 to 7 kHz and a receiver located remote from the transmitter for receiving the charge displacement current and converting the current into a form of electric power usable by an electrical device coupled to the receiver, the transmitter including means for generating electrical power at a first low frequency, means for pulsing the power at the radiating frequency, transformer means for raising the voltage of the pulsed power to a high voltage for radiating, and a radiating element coupled to an output of the transformer.

2. The electric transmission system of claim 1, wherein the transformer means includes a primary coil forming a part of a first tuned circuit.

3. The electric transmission system of claim 2, wherein the first tuned circuit is in parallel with the pulsing means and is tuned to a higher frequency than the radiating frequency.

4. The electric transmission system of claim 3, wherein the higher frequency is in the range of about 50-100 kHz.

5. The electric transmission system of claim 3, wherein the transformer means includes a secondary coil forming a part of a second resonant circuit.

6. The electric transmission system of claim 5, wherein the second tuned circuit is tuned to the same frequency as the first tuned circuit.

7. The electric transmission system of claim 6, wherein the means for receiving the charge displacement current comprises an, antenna and a ground plane coupled to an interrupter in series with a tuned circuit.

8. The electric transmission system of claim 7, wherein the tuned circuit includes a coil forming a primary side of a transformer and the converting means comprises a secondary side coil of the transformer coupled to a power converter.

9. The electric transmission system wherein of claim 8 the interrupter operates at the frequency of the charge displacement current and the tuned circuit is tuned to the frequency of the charge displacement current.

10. The electric transmission system of claim 5 wherein a third tuned circuit is tuned to the frequency of the displacement current, is coupled to the secondary coil of the transformer means, and includes the radiating element.

11. The electric transmission system of claim 10, wherein the radiating element is a capacitor plate of the third tuned circuit.

12. The transmission system of claim 1, wherein the receiver comprises means for receiving the charge displacement current and means coupled for converting the charge displacement current into electric power of a desired frequency and voltage.

* * * * *